No. 628,969.  
J. WADSWORTH.  
ANIMAL TRAP.  
(Application filed Oct. 13, 1898.)  
Patented July 18, 1899.

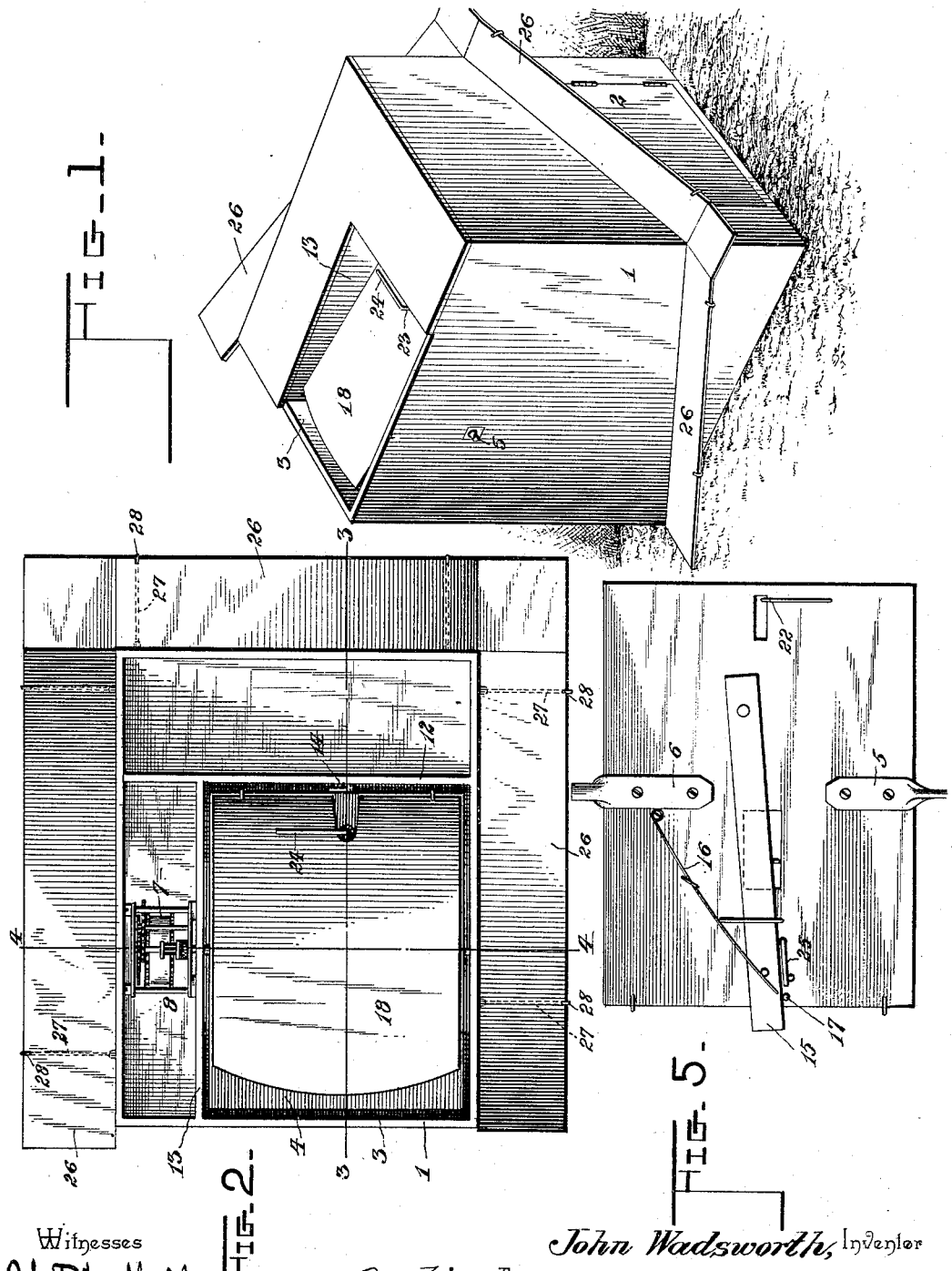

(No Model.)  
2 Sheets—Sheet 2.

Witnesses  
John F. Deufferwiel  
J. F. W. Riley

John Wadsworth, Inventor  
By his Attorneys,  
C. A. Snow & Co.

UNITED STATES PATENT OFFICE.

JOHN WADSWORTH, OF MANCHESTER, ILLINOIS.

ANIMAL-TRAP.

SPECIFICATION forming part of Letters Patent No. 628,969, dated July 18, 1899.

Application filed October 13, 1898. Serial No. 693,422. (No model.)

*To all whom it may concern:*

Be it known that I, JOHN WADSWORTH, a citizen of the United States, residing at Manchester, in the county of Scott and State of Illinois, have invented a new and useful Animal-Trap, of which the following is a specification.

The invention relates to improvements in animal-traps.

The object of the present invention is to improve the construction of self-set and ever-set animal-traps and to provide a simple and efficient one which will be positively reliable in operation and capable of catching successively a number of animals without replenishing the bait.

The invention consists in the construction and novel combination and arrangement of parts, as hereinafter fully described, illustrated in the accompanying drawings, and pointed out in the claims hereto appended.

Figure 3:
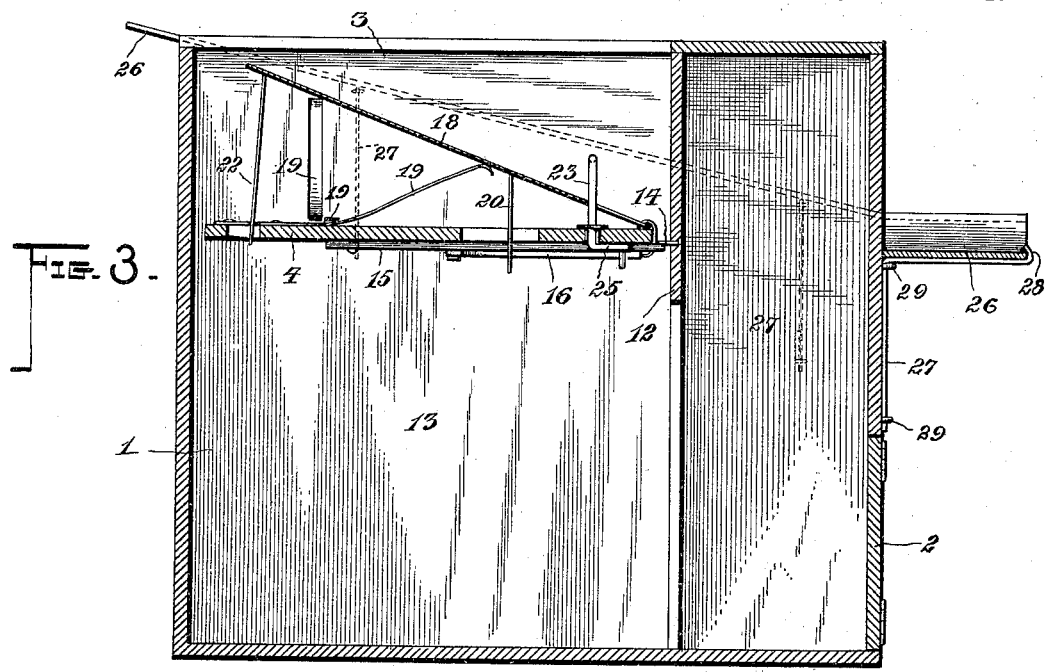
Figure 4:
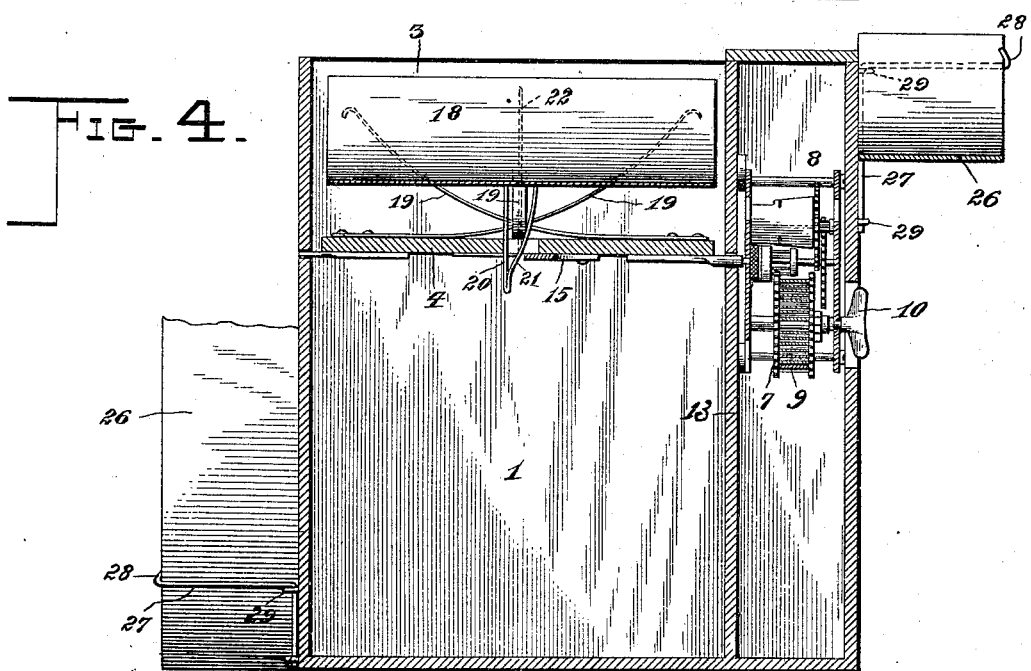

In the drawings, Figure 1 is a perspective view of an animal-trap constructed in accordance with this invention. Fig. 2 is a plan view, partly in section. Fig. 3 is a vertical sectional view on line 3 3 of Fig. 2. Fig. 4 is a transverse sectional view on line 4 4 of Fig. 2. Fig. 5 is a reverse plan view of the rotary trap-door.

Like numerals of reference designate corresponding parts in all the figures of the drawings.

1 designates a casing constructed of any suitable material and having its lower portion forming a cage or receptacle for captured animals and provided at one end with a door 2 for the removal of the same. The top of the casing is provided with an opening 3, in which is mounted a rotary trap-door 4, adapted to receive a bait for attracting an animal and capable of being tripped and rotated by the same, whereby such animal is precipitated into the lower portion or trap of the casing. The rotary trap-door 4 is journaled in suitable bearings and has separate journals 5 and 6; but a continual shaft may be employed, if desired.

The journal 6 is extended and is connected with a spring-actuated gear-wheel 7, adapted to actuate the rotary trap-door and forming a part of a spring-motor 8 of any ordinary construction. The spring-motor 8, which is provided with a barrel-spring 9, has a winding-shaft connected with the same and is provided with an exteriorly-arranged key 10, located in an opening of the casing, as illustrated in Fig. 4 of the accompanying drawings; but the key may be located entirely outside of the casing, if desired. Each time the rotary trap-door is tripped it is rotated one revolution, and the spring-motor may be constructed for rotating the trap-door any desired number of revolutions at one winding of it, as will be readily understood. The casing is provided with partitions 12 and 13, forming a well for the reception of the rotary trap-door, and the latter is supported in a horizontal position by a stop 14, mounted on and extending outward from the partition 12.

On the lower face of the rotary trap-door is pivotally mounted a spring-actuated catch 15, projecting beyond one end of the trap-door and arranged to engage the stop 14 to limit the rotation of the trap-door and support the same in position for tripping. The catch, which is pivoted at its inner end, is adapted to swing laterally, and one of its edges is engaged by a spring 16, which holds the catch normally against a stop or projection 17. When the trap-door is tripped, the catch is swung laterally against the action of the spring 16 sufficiently to clear the stop 14, and as soon as the animal is precipitated into the bottom portion of the casing the catch resumes its normal position and stops the rotation of the trap-door, holding the same in position to be again tripped.

The tripping of the trap-door is effected by means of a depressible platform 18, normally supported by springs 19 and 20 in an elevated position, and provided with a depending tapering arm 21, consisting, preferably, of a loop, as shown, and adapted when the platform is depressed to force the catch laterally out of engagement with the stop 14. The springs 19 are disposed transversely of the trap-door, being secured at their lower ends to the same and having their upper ends loosely engaging the inner or lower face of the platform. The other spring 20 is disposed longitudinally of the trap-door and is constructed in the same manner as the springs 19.

The trap-door is provided with an opening for the passage of the arm 21, and the upward movement of the depressible platform is limited by an arm or rod 22, extending through an aperture of the trap-door, secured at its upper end to the platform and having its lower end bent at an angle and engaging the lower face of the said trap-door.

When the weight of a mouse or other animal is insufficient to trip the trap-door, this result is effected by means of a rock-shaft 23, journaled on and extending through the trap-door, provided at its lower end with a short horizontal arm and having a long horizontal arm 24 at its upper end, adapted to receive a bait. The short lower arm 25 is arranged to engage the catch, and the upper arm, which receives the bait, provides sufficient leverage so that an animal pulling on the bait will rock the shaft and trip the trap-door.

In order to enable animals attracted by the bait to reach the top of the casing, an inclined platform or way 26 is provided and is arranged on the exterior of the sides of the casing, as clearly illustrated in Fig. 1 of the accompanying drawings. This inclined platform or way, which extends from the top to the bottom of the casing, is preferably arranged on three sides of the same and consists of three sections supported by substantially L-shaped brackets 27, provided at the outer ends of its horizontal arms with upwardly-extending projections 28 and having their vertical arms mounted in suitable eyes 29 of the casing, whereby the brackets are hinged to the same and are adapted to fold compactly for shipping or storing. The sections of the inclined platform or way are adapted to be readily removed from the brackets when it is desired to store or ship the traps.

The invention has the following advantages: The trap, which is simple and comparatively inexpensive in construction, is positive and reliable in operation and is capable of capturing a large number of animals successively without rebaiting it. The platform is adapted to be tripped by the weight of an animal, and should a mouse or other animal be too light to effect this result any pulling at the bait will accomplish the same.

Changes in the form, proportion, and minor details of construction may be resorted to without departing from the spirit or sacrificing any of the advantages of this invention.

What is claimed is—

1. A trap comprising a casing, a rotary trap-door mounted therein, a catch pivotally mounted on the lower face of the trap-door and arranged to engage the casing to support the said trap-door in a horizontal position, and a vertical rock-shaft passing through the trap-door and provided at its lower end with a horizontally-swinging arm arranged to engage the catch, said rock-shaft being provided at its upper end with an arm extending outward at an angle and adapted to receive a bait, substantially as described.

2. A trap comprising a casing, a rotary trap-door mounted therein, a catch arranged on the lower face of the trap-door and adapted to support the latter in a horizontal position, a depressible platform arranged on the trap-door, and an arm depending from the platform and having an inclined edge arranged to engage the catch, substantially as and for the purpose described.

3. A trap comprising a casing, a rotary trap-door mounted therein, a depressible platform arranged on the trap-door, a pivoted spring-actuated catch supporting the trap-door in a horizontal position and arranged to be engaged and tripped by the platform, and a bait-receiving rock-shaft arranged to engage the catch and adapted to trip the trap-door, substantially as described.

4. A trap comprising a casing, a pivoted trap-door mounted therein and capable of rotation, a depressible platform hinged to the trap-door, springs for supporting the platform in an elevated position, an arm depending from the platform and limiting the movement of the same, and a catch arranged to be tripped by the platform, substantially as described.

5. A trap comprising a casing, a rotary trap-door means for supporting and tripping the same, L-shaped brackets hinged to the sides of the casing and arranged at different elevations, and an inclined platform or way detachably supported by the brackets, substantially as described.

In testimony that I claim the foregoing as my own I have hereto affixed my signature in the presence of two witnesses.

JOHN WADSWORTH.

Witnesses:
MARY J. TOSH,
GEO. W. CLUNEN.